Jan. 21, 1964 T. W. TECHLER 3,118,610
CONTROLS FOR PRESSURE WASHERS
Filed Dec. 17, 1962 2 Sheets-Sheet 2
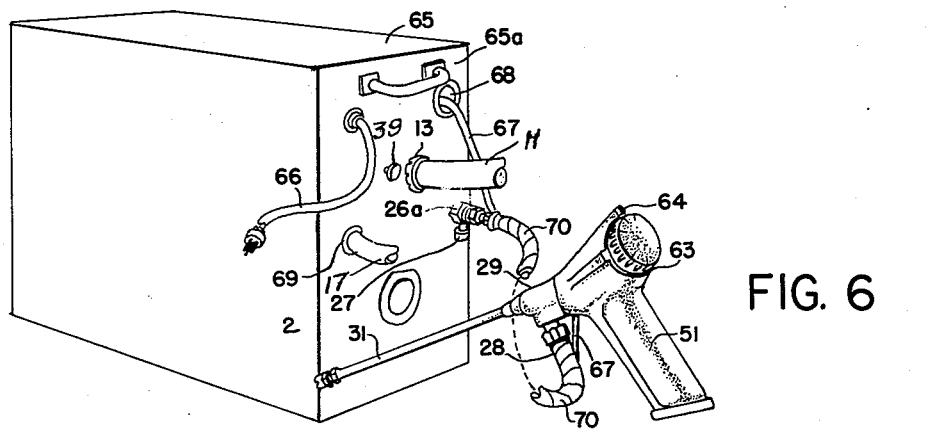
FIG. 6
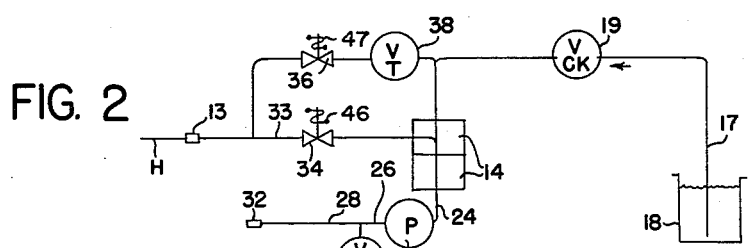
FIG. 2
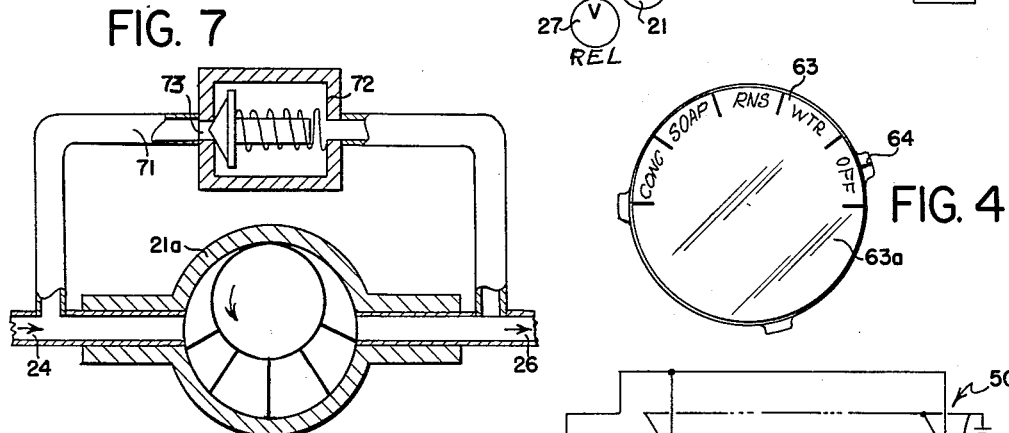
FIG. 7
FIG. 4
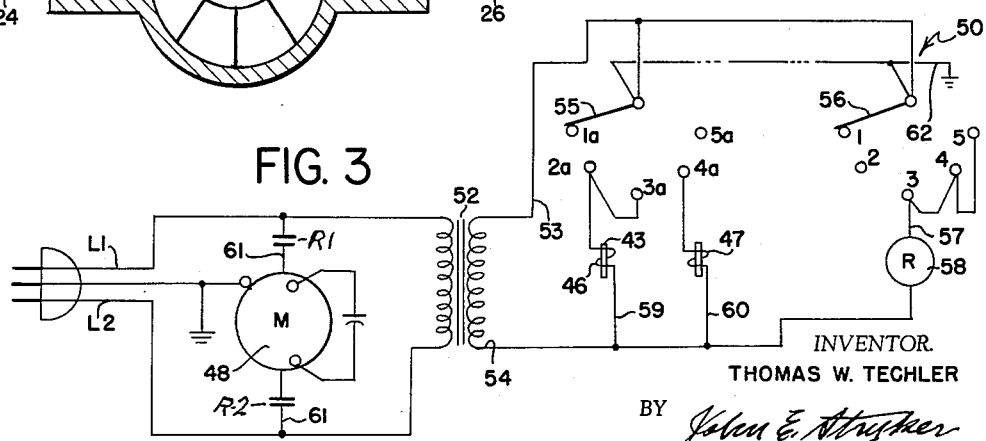
FIG. 3
INVENTOR.
THOMAS W. TECHLER
BY John E. Stryker
ATTORNEY United States Patent Office 3,118,610
Patented Jan. 21, 1964

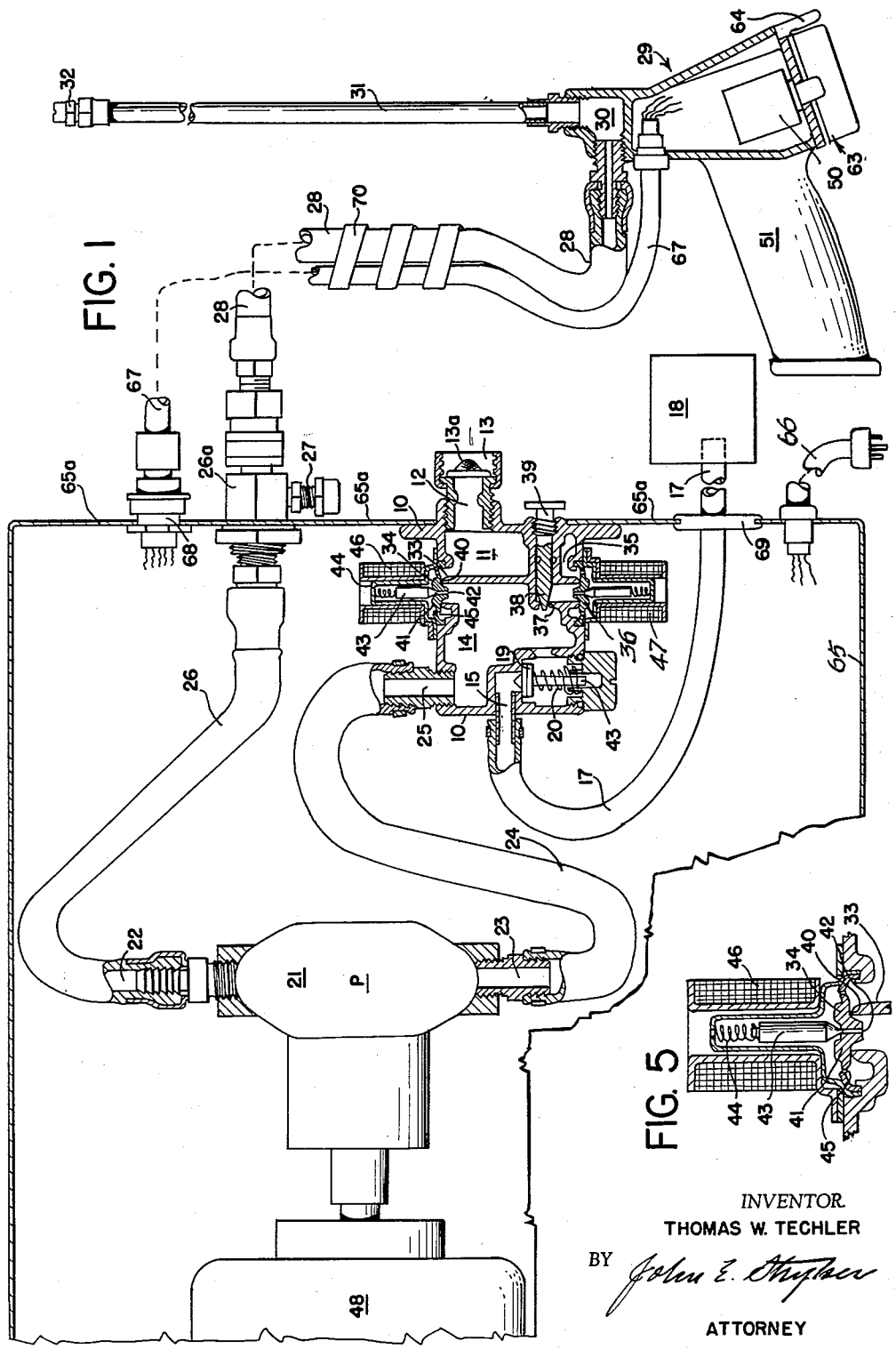

3,118,610
CONTROLS FOR PRESSURE WASHERS
Thomas W. Techler, North St. Paul, Minn., assignor to
L. & A. Products, Inc., St. Paul, Minn., a corporation
of Minnesota
Filed Dec. 17, 1962, Ser. No. 245,123
12 Claims. (Cl. 239—304)

This invention relates to improvements in spraying and washing equipment particularly adapted to deliver a mixture of cleaning fluids under high pressure against hard surfaces to be cleaned, and has for its principal object to provide improved controls adapted to be selectively operated to deliver either of two cleaning fluids or a mixture of both fluids, under high or relatively low pressure and velocity, against the surfaces to be cleaned.

A particular object is to provide controls for a pressure washer including a chambered multiple port valve having a mixing chamber adapted to be supplied with a plurality of liquids from different sources, an outlet connected to a high pressure pump for delivering the fluids, valves controlling the flow of the several fluids to the mixing chamber, and conveniently located controls for the pump and valves whereby either of the liquids or a mixture of them may be supplied under pressure to a discharge conduit.

The invention also includes certain other novel features of construction which will be more fully pointed out in the following specification and claims.

In the accompanying drawing a preferred embodiment of my invention is illustrated somewhat schematically.

Referring to the drawing:

FIGURE 1 shows the principal mechanical elements of the washer;

FIG. 2 is a hydraulic flow diagram illustrative of the invention;

FIG. 3 is a wiring diagram indicating the principal electrical elements;

FIG. 4 is an elevational view of the dial of the control knob for the five position rotary switch;

FIG. 5 is a longitudinal sectional view showing details of a suitable electro-magnetically operated valve for controlling the flow of one of the liquids to the mixing chamber;

FIG. 6 is a perspective view showing the housing, connecting conduits and controls, and FIG. 7 shows, schematically, an alternate type of pump and by-pass therefor.

As best shown in FIG. 1, my improved controls include a chambered multiple port mixing valve having a casing 10, a first inlet chamber 11 and port 12 and a hose coupling 13 adapted to be connected to a source of a first liquid. For example, water under ordinary tap or line pressure on the order of 20 to 50 pounds per square inch may be supplied to the coupling 13 by a hose H, FIG. 2. A strainer 13a may be provided for the liquid entering at the port 12. By a suitable partition the inlet chamber 11 is separated from a mixing chamber 14 to which a second liquid, e.g., a cleaning fluid or concentrated liquid detergent is supplied through a second port 15. A flexible tube 17 is disposed to supply the port 15 with the second liquid contained in a tank, drum or other source 18. A check valve 19 is interposed between the port 15 and mixing chamber 14 and is biased by a spring 20 to its normally closed position wherein it prevents flow from the mixing chamber to the port 15 and tube 17.

Liquid is withdrawn from the mixing chamber 14 by means of a power driven positively acting pump 21 having a high pressure outlet 22, and an inlet 23 connected by a conduit 24 to an outlet port 25 communicating with the mixing chamber 14. A high pressure hose member 26 extends from the port 22 and has a discharge end connected by suitable fittings 26a with a pressure relief valve 27 and a long, flexible high pressure discharge conduit 28 terminating in a handle assembly 29. The assembly 29 has a passage 30 connecting the conduit 28 to a rigid discharge tube 31 of convenient length terminating in a spray nozzle 32 or other means for applying the high pressure cleaning and rinsing liquids to the surface to be cleaned. For most cleaning jobs a suitable high velocity nozzle is preferable, although a brush, scraper, squeegee, or other tool may be provided to augment the cleaning effect of the high pressure spray.

From the inlet chamber 11 a flow passage 33 extends to the chamber 14 through a valve indicated generally at 34, and a second passage 35 extends from the chamber 11 through a second valve indicated generally at 36 to a chamber 37. An outlet from chamber 37 comprises a restricted annular passage communicating with the chamber 14 under control of a needle valve 38. This needle valve has a head 39 which projects to the exterior of the washer housing to facilitate adjusting the rate of flow between the chambers 37 and 14.

Since the valves 34 and 36 are similarly constructed the details thereof will be understood by reference to FIG. 5 which shows the valve 34. An annular valve seat 40 surrounds the outlet end of the passage 33 and a flexible elastic valve closure member 41 of the diaphragm type is fixed at its periphery in the casing 10 and adapted to move to and from the seat 40. This valve is of the solenoid actuated type and has an axially disposed restricted passage 42 through the closure member 41 which is normally closed by a conical end of a solenoid plunger 43. A spring 44 biases the plunger toward closed position relative to the passage 42 so that the passage is closed when the solenoid is deenergized. Minute perforations 45 of smaller total cross-sectional area than that of the passage 42 are formed in the diaphragm 41 to equalize the pressure on the upper and lower sides thereof when the solenoid is deenergized. When the solenoid coil indicated at 46 is energized, the plunger 43 is withdrawn from the passage 42 against the bias of the spring 44 to open the passage 42, so that when the pressure in the chamber 11 exceeds that in the chamber 14, the diaphragm is moved to open position relative to its seat 40. The valve 36 is similarly constructed and is provided with independently energizable solenoid coil 47, as more fully hereinafter described.

A motor 48 is operatively connected to the pump 21 so that when the motor is energized the pump is operated. This pump may be of several different suitable or conventional types examples of which are the positive displacement piston type, the gear type, rotary vane type or other type adapted to create sub-atmospheric pressure sufficient to draw one of the liquids from a source connected to the inlet port 15 into the mixing chamber 14 past the spring biased check valve 19. Energization of the solenoid coils 46 and 47 and motor 48 are under control of a manually operable switch, indicated generally by the numeral 50, which is mounted on the handle 51 of the assembly 29. This switch is of the 5 position, 2 gang rotary type.

Referring to the wiring diagram, FIG. 3, current may be supplied from an ordinary 115-volt, 60-cycle alternating current outlet through line conductors L–1 and L–2 connected across the primary coil of a transformer 52. Current at a suitable lower voltage may be supplied from the secondary coil of the transformer 52 to circuit conductors 53 and 54. Branches of the conductor 53 extend to rotary contacts 55 and 56 of the 5-pole gang switch 50. A branch 57 of the conductor 54 includes the coil of a relay 58 and has fixed contacts 3, 4 and 5 for closing the circuit when the rotary contact 56 is moved to its positions 3, 4 or 5. A branch circuit 59 includes the solenoid coil 46 and contacts 2a and 3a of the rotary switch 50 to coact with its movable contact 55 in closing circuit 59. Another branch circuit 60 includes the coil 47 of the solenoid valve 36, and a switch contact 4a for movable contact 55 of the rotary switch. As shown, the motor 48 is of the capacitor type and is included in a branch circuit 61 which also includes contacts R–1 and R–2 of the relay 58. These contacts are normally open and are closed when the relay is energized to energize the motor 48. The housing of the 2-gang, 5-pole switch 50 has a ground connection indicated at 62.

As shown in FIGS. 1 and 4, the switch 50 has a control knob 63, the dial face of which is indicated at 63a and is provided with suitable legends and a fixed index finger 64 to indicate the five positions. As shown these positions are, in succession counter-clockwise, "OFF," "WTR," indicating water, a third position "RNS" indicating rinse, a fourth position "SOAP" indicating detergent, and a fifth position "CONC" indicating concentrate. By turning the knob 63 to the selected positions relative to the fixed index finger 64 the circuits shown in FIG. 3 may be selectively energized.

Referring to FIGS. 1 and 6, a number of the principal mechanical and electrical elements are contained in a housing 65 having a front panel 65a from which the external components extend. Current is supplied to the electrical components within the housing by the line conductors L–1 and L–2 which are contained in a flexible insulated cord 66. The water or first liquid supply is connected to the coupling member 13, and conductors 53, 54, 57, 59 and 60 are contained in a protective flexible cord 67 extending to the housing connector indicated at 68. The flexible tube 17 passes through a grommet 69 surrounding an opening in the panel 65a. To protect the control switch cord 67 containing the five conductors for the switch 50 this cord is extended along and in contact with the high pressure hose 28 and is enclosed therewith in an elastic flexible scuff jacket 70, as indicated in FIG. 6 and schematically in FIG. 1. The scuff jacket 70 is preferably constructed from somewhat elastic tough plastic material which has sufficient elasticity to retain its grip on both the cord 67 and high pressure hose 28. The pump 21 is designed to deliver liquid to the outlet conduit at pressures up to 500 pounds per square inch and at a rate on the order of two gallons per minute at the nozzle outlet 32.

As hereinbefore indicated, various types of positive displacement pumps may be used as the pump 21. The preferred piston type is a double piston pump manufactured by Hypro Engineering Company, Model 53005. This piston pump has inlet and outlet valves which are biased to prevent backflow from the high pressure side to the low pressure side of the pump and which are free to open to allow flow at the tap line supply pressure, for example, through the pump 21 to the discharge conduit 26.

An alternate vane type pump is shown schematically in FIG. 7 and indicated by the numeral 21a. To allow liquid at tap pressure to pass the pump 21a freely when it is not in operation, a by-pass conduit 71 extending from the conduit 24 to the conduit 26 may be provided. This by-pass includes a check valve 72 which is biased to normally close at an inlet port 73, thereby preventing reverse flow from the discharge conduit 26 to the inlet conduit 24.

*Operation*

Assuming that the unit is connected to a source of electic power and to the sources of the first and second liquids, as hereinbefore described, the cleaning operation is normally started with the knob 63 of the switch 50 in the "Off" or No. 1 position indicated in FIGS. 3 and 4. To start the flow of the first liquid, the knob 63 is turned to the No. 2 or "water" position thereby moving the contact 55 to close the circuit 59 at contact 2a. This energizes the coil 46 of the solenoid valve 34 and causes the plunger 43 to open the passage 42. Pressure on the upper side of the closure member 41 is thereby relieved and the fluid pressure on the lower side raises the member 41 from its seat 40. Assuming that the first liquid is water supplied at tap pressure, water entering the port 12 and chamber 11 now flows through the passage 33, chamber 14, port 25, conduit 24 and pump 21 to the pump discharge conduits, thereby displacing air from the flow system leading to the pump and insuring that the pump will be fully operative when the motor 48 is energized.

To start the pump, the motor 48 is energized by turning the switch knob 63 to its third position. This moves the rotary contact 56 of the switch 50 to close at fixed contact 3, thereby energizing branch circuit 57 and the coil of relay 58. The resulting closing of relay contacts R–1 and R–2 causes the motor circuit 61 and motor 48 to be energized so that the pump 21 is operated. The operator, by grasping the handle 51 readily directs the high pressure spray against the surface to be cleaned. As long as the valve 34 remains open the pressure in the mixing chamber 14 remains high enough so that the check valve 19 is retained in its closed position by the spring 20 and the second liquid is not drawn through the tube 17. Thus when the rotary switch is in the rinse position only the first liquid is delivered under high pressure to the nozzle 32.

To supply a mixture of the liquids to the delivery nozzle, the valve 50 is moved to its fourth or "soap" position on the dial 63a. As will be evident from FIG. 3, when the switch contact 55 is in its fourth position the solenoid coil 46 is deenergized, the coil 47 is energized and the motor 48 operating the pump continues to be energized. Upon the deenergization of the coil 46 and closing of the valve 34 the pressure in the mixing chamber 14 is reduced sufficiently to open the check valve 19 and draw the second liquid from the source 18. At the same time the solenoid coil 47 is energized and causes the opening of the valve 36. As a result, water or the first liquid is drawn into the chamber 14 from the chamber 11 through the passage 35, chamber 37 and past the needle valve 38. The proportion of the first liquid which is added to the second liquid in the mixing chamber 14 is adjustable by suitable manipulation of the threaded needle valve 39. Thus increasing the size of the passage through this valve increases the proportion of the first liquid which is added to the second liquid.

To deliver full strength or concentrated detergent or other second liquid through the nozzle 32, the operator moves the switch knob 63 to its fifth position whereby both of the solenoid valves 34 and 36 are deenergized and the pump 21 continues to operate. Upon deenergization of the solenoid coils 46 and 47 the plungers 43 of the valves 34 and 36 close the axial passages 42 with the result that the fluid under pressure from the chamber 11 acting on the upstream sides of the diaphragm closure members and reduced pressure in the mixing chamber 14 acting on the opposite sides of the closure members causes both valves to close. The concentrated second liquid is thereupon drawn from the source 18 through the tube 17, port 15, past check valve 19 to chamber 14 and thence through conduit 24 and pump 21 to be discharged at greatly increased pressure and velocity through the conduit members 26 and 28, passage 30, tube 31 and nozzle 32. The pressure relief valve 27 is of conventional type adapted to relieve excessively high pressure in the high pressure line in the event that the discharge end of the line should become clogged or obstructed.

When the switch knob 63 is returned to the "OFF" position after a period of use of the washer, the motor 48 is deenergized, the valves 34 and 36 are closed, and the pump 21 is inoperative. During a short interval of time after the pump stops the subatmospheric pressure condition in the mixing chamber 14 continues but this pressure returns to tap line pressure by flow through the minute apertures 45 in the diaphragm closure members 41 of valves 34 and 36. Thus the pressure at opposite sides of each of these valve closure members is equalized at the start of each cleaning operation.

To deliver full strength or concentrated detergent or other second liquid through the nozzle 32, the operator moves the switch knob 63 to its fifth position whereby both of the solenoid valves 34 and 36 are deenergized and the pump 21 continues to operate. Upon deenergization of the solenoid coils 46 and 47 the plungers 43 of the valves 34 and 36 close the axial passages 42 with the result that the fluid under pressure from the chamber 11 acting on the upstream sides of the diaphragm closure members and reduced pressure in the mixing chamber 14 acting on the opposite sides of the closure members causes both valves to close. The concentrated second liquid is thereupon drawn from the source 18 through the tube 17, port 15, past check valve 19 to chamber 14 and thence through conduit 24 and pump 21 to be discharged at greatly increased pressure and velocity through the conduit members 26 and 28, passage 30, tube 31 and nozzle 32. The pressure relief valve 27 is of conventional type adapted to relieve excessively high pressure in the high pressure line in the event that the discharge end of the line should become clogged or obstructed.

When the switch knob 63 is returned to the "OFF" position after a period of use of the washer, the motor 48 is deenergized, the valves 34 and 36 are closed, and the pump 21 is inoperative. During a short interval of time after the pump stops a slightly subatmospheric pressure condition exists in the mixing chamber 14. Flow through the minute apertures 45 in the diaphragm closure members 41 of valves 34 and 36 equalizes the pressure on the upper side of the member 34 with that on the lower side of the member 36 and in the inlet chamber 11.

Important fields of use of this invention include the removal of grease and grime from industrial floors, walls and windows, domestic exterior walls and windows, machine shop equipment, automotive motors and the exterior of automotive vehicles and heavy mobile equipment.

I claim:

1. In a control for a pressure washer, in combination, a chambered multiple port mixing valve having a first inlet chamber and port connected to a source of supply of a first liquid, a mixing chamber having a second inlet port connected to a source of supply of a second liquid and an outlet port, a check valve biased to cut off flow from said mixing chamber to said supply of the second liquid, a power-actuated pump having a pump discharge port and an inlet port connected to said outlet port of the mixing chamber, a flexible discharge conduit communicating with said pump discharge port, first and second passages connecting said first inlet chamber to said mixing chamber, means for restricting flow through said second passage, first and second valves interposed in said first and second passages respectively for selectively controlling flow therethrough to said mixing chamber, and means for selectively activating said pump and first and second valves whereby either of said liquids or a mixture of both of them may be supplied under pressure to said flexible discharge conduit.

2. A control in accordance with claim 1 in which said means for restricting flow through said second passage comprises a manually operable throttle valve.

3. A control in accordance with claim 1 in which said power actuated pump is of the positive displacement type.

4. A control in accordance with claim 1 in which said pump is operatively connected to an electric motor and said first and second valves are electromagnetically energizable.

5. A control in accordance with claim 4 in which said means for selectively activating said pump and first and second valves comprise a multiple pole rotary switch and electric circuits under control of said switch for selectively energizing said motor and first and second valves.

6. A control in accordance with claim 1 in which said flexible discharge conduit is elongated and includes at its discharge end a handle assembly and spray nozzle, and in which said means for selectively activating said pump and first and second valves is mounted on said handle assembly.

7. A control in accordance with claim 5 in which said flexible discharge conduit has at its discharge end a spray nozzle and a handle assembly for directing the spray from said nozzle, and in which said multiple pole rotary switch is mounted on said handle assembly.

8. A control in accordance with claim 1 in which said pump is of the positive displacement type, and including a by-pass for the pump extending from the inlet to the outlet side thereof and a check valve interposed in said by-pass allowing flow therethrough to said discharge conduit and preventing reverse flow through said by-pass.

9. In a control for a pressure washer, in combination, a chambered multiple port mixing valve having a first inlet chamber connected to a source of supply of a first liquid under super-atmospheric pressure; a mixing chamber having a second inlet port connected to a source of supply of a second liquid under substantially atmospheric pressure, said mixing chamber having an outlet port; an electrically energizable power actuated pump having a pump discharge port and an inlet port connected to said mixing chamber outlet port; a flexible discharge conduit communicating with said pump discharge port; first and second passages connecting said first inlet chamber to said mixing chamber, electrically energizable, normally closed first and second valves interposed in said first and second passages respectively for selectively controlling flow therethrough, and means for selectively energizing said pump and first and second valves, whereby either of said liquids or a mixture of both of them may be supplied under pressure to said flexible discharge conduit.

10. A control in accordance with claim 9 in which said flexible discharge conduit includes a handle assembly at its discharge end and said means for selectively energizing said pump and first and second valves include electric circuit means and a manually operable multiple pole rotary switch mounted on said handle assembly.

11. A control in accordance with claim 9 including a manually operable throttle valve interposed in said second passage connecting said inlet chamber to said mixing chamber.

12. A control in accordance with claim 10 including a check valve interposed between said source of supply of the second liquid and said mixing chamber whereby reverse flow from said mixing chamber to said source is prevented.

References Cited in the file of this patent

UNITED STATES PATENTS

| | | |
|---|---|---|
| 1,457,634 | Neri | June 5, 1923 |
| 2,638,383 | Hall | May 12, 1953 |
| 2,641,508 | Stoner et al. | June 9, 1953 |
| 2,951,503 | Windsor | Sept. 6, 1960 |
| 2,987,259 | Lindquist | June 6, 1961 |
| 3,001,717 | Rimska et al. | Sept. 26, 1961 |